United States Patent [19]
Rokugawa

[11] Patent Number: 5,473,636
[45] Date of Patent: Dec. 5, 1995

[54] DATA DISCRIMINATING CIRCUIT AND AN OPTICAL RECIEVER USING THE SAME

[75] Inventor: Hiroyuki Rokugawa, Kawasaki, Japan

[73] Assignee: Fujitsu Limited, Kawasaki, Japan

[21] Appl. No.: 135,548

[22] Filed: Oct. 14, 1993

[30] Foreign Application Priority Data

Feb. 26, 1993 [JP] Japan ................................. 5-062637

[51] Int. Cl.⁶ .................................................. H04L 27/14
[52] U.S. Cl. ......................... 375/324; 375/340; 359/175; 359/189
[58] Field of Search ............................... 375/324, 80, 94, 375/340, 97; 359/175, 189, 133, 152, 155

[56] References Cited

U.S. PATENT DOCUMENTS

| | | | |
|---|---|---|---|
| 4,514,854 | 4/1985 | Ashida | 375/94 |
| 4,841,519 | 6/1989 | Nishio | 370/3 |
| 4,857,727 | 8/1989 | Lenz et al. | 250/227 |
| 5,340,980 | 8/1994 | Bianchini et al. | 250/214 |

Primary Examiner—Edward L. Coles, Sr.
Assistant Examiner—Madeleine Au Nguyen
Attorney, Agent, or Firm—Staas & Halsey

[57] ABSTRACT

A data discriminating circuit which discriminates a signal, particularly, a data discriminating circuit which can perform data discrimination with the proper phase relation settled between data and a clock with a simple circuit structure. The data discriminating circuit comprises a clock distributor for generating first and second clock signals having different phases, first and second data discriminating/judging sections for respectively receiving the first and second clock signals and commonly receiving data, and a discriminated-data selecting section, which receives first discriminated data discriminated with the first clock signal, a discrimination/ judgment result based on the phase relation between the first discriminated data and the first clock signal, second discriminated data discriminated with the second clock signal, and a discrimination/judgment result based on the phase relation between the second discriminated data and the second clock signal, and selectively outputs the first or second discriminated data based on both discrimination/ judgment results.

24 Claims, 15 Drawing Sheets

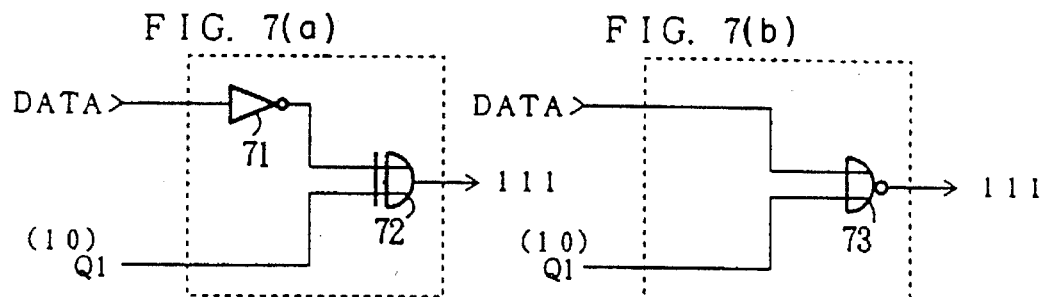
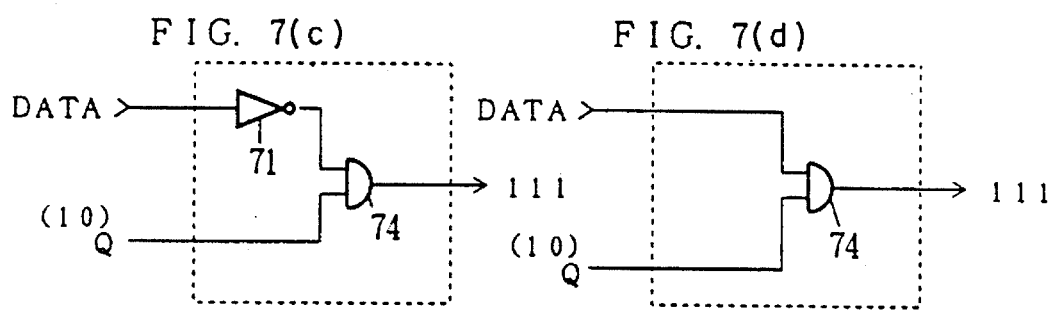
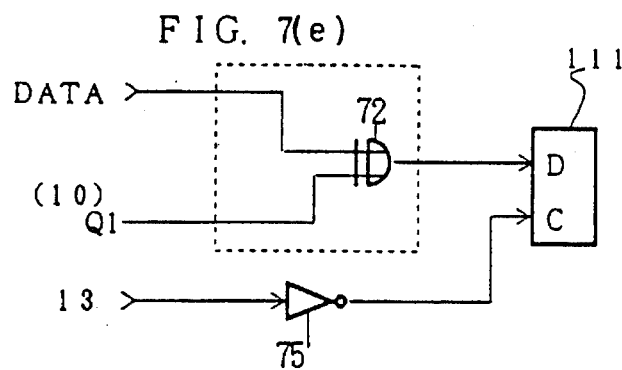

6 1 : clock extractor

DATA DISCRIMINATING CIRCUIT AND AN OPTICAL RECIEVER USING THE SAME

BACKGROUND OF THE INVENTION

1. Field of the Invention

The present invention relates to a data discriminating circuit, which performs signal discrimination in a receiver of a digital signal transmission system, and an optical receiver using the data discriminating circuit.

2. Description of the Related Art

Due to the development of the optical communication technology, attention is paid to a so-called fiber to the home (FTTH) or the like and study has been made on this system. This FTTH system implements optical transmission technology to lay optical fibers in subscriber systems as well as the trunk line system to thereby ensure wide-band information transmission of dynamic images or the like. An important factor in implementing optical transmission technology in a subscriber system is that the implementation should be accomplished at a low cost. It is therefore necessary to design the structures of the transmitter and receiver considerably simpler than those used in the trunk line system, thus making the adjusting components as few as possible.

In the receiving section, particularly, it is necessary to properly adjust the timing relation (phase relation) between data and a discrimination clock in the data discriminating circuit which converts an optical signal, sent over an optical fiber, into an electric signal and then discriminates digital "1" or "0."

It is also important to simplify this circuit portion by LSI or the like to thereby eliminate the need for separate adjustments as much as possible. Even in designing the circuit into LSI, the structure should be made as simple as possible to meet some requirements for the implementation of the data discriminating circuit in the subscriber system, such as reduction of consumed power and reduction of the circuit scale.

FIG. 16(a) illustrates the structure of a conventional optical receiver serving as an optical repeater that executes data transmission between terminal devices in the trunk line system. In the conventional optical receiver, an optical signal transmitted over an optical fiber 20 is photoelectrically converted into an electric signal by a light-receiving element 21. This electric signal is amplified to a discriminatable level by an equalizer/amplifier 22.

At the same time a discrimination clock is extracted from the received signal by a timing circuit 24, and this clock is input together with the amplified signal to a discriminating/reproducing circuit 23.

At this time, the phase relation between the amplified signal and the clock from the timing circuit 24, which are input to the discriminating/reproducing circuit 23, is not stable due to a variation in transmission time in the individual circuits or other factors. To keep the proper phase relation, some kind of adjusting means should be provided to adjust the phase relation.

In many optical repeaters of the above type, a coaxial cable 25 or the like is used to connect the timing circuit 24 to the discriminating/reproducing circuit 23 and the length of the coaxial cable 25 is properly adjusted for each receiver to thereby provide the desired phase relation.

Due to the recent development and improvement of IC technology, there appears an optical receiver equipped with a circuit for automatically adjusting the phase relation. FIG. 16(b) exemplifies such an automatic phase adjusting circuit (which has been proposed by Peter Cochrane et al. in IEEE Journal on Selected Areas in Communications, Vol. SAC-4, No. 9, Dec. 1986).

In the circuit shown in FIG. 16(b), a signal before discrimination and a signal after discrimination are respectively input to S-R latches 26 and 27. The signal pulses output from those S-R latches are integrated, and the level of the resultant signal is then compared with a reference level. The result of the comparison is fed back to a voltage-controlled phase shifter 28 to keep the phase of the clock at a predetermined value.

If the optimal phase relation changes in the circuit shown in FIG. 16(b) due to the temperature characteristic of the circuit or the time-dependent characteristic of the circuit, a constant phase relation can be maintained by the feedback control unlike in the case where a coaxial cable is used as shown in FIG. 16(a).

This automatic phase adjusting circuit is designed to perform analog control on the clock phase to keep the proper phase. This circuit is complicated and increases the consumed power in many cases. It is therefore difficult to adapt this circuit to the subscriber system unless the circuit structure is simplified and the consumed power is reduced.

As described above, the transmission length in the subscriber system is very short (about 1 to several Km) as compared with that in transmission between terminal devices. Therefore, the optical level of the input to the optical receiver can be increased systematically. Accordingly, the data discriminating circuit can have a large phase margin to secure the desired characteristic in the received signal. Instead of the aforementioned analog phase control, therefore, a plurality of clocks having different phases may be prepared and a clock of a particular phase may be selected from those clocks to acquire the desired discrimination characteristic.

An example of the structure of such a data discriminating circuit is disclosed in Japanese Unexamined Patent Publication Nos. 233850/1989 and 188050/1989. In the former Japanese Unexamined Patent Publication No. 233850/1989, the same data is discriminated using two types of clocks having slightly different timings. When the discrimination results differ from each other, it is considered that the clock phase is not the proper one and the clock phase is inverted.

In the latter Japanese Unexamined Patent Publication No. 188050/1989, a clock with a frequency twice the data transmission rate is prepared. When data is input, a T-FF (flip-flop) is reset at its rising edge to frequency-divide the double-frequency clock, and the data is discriminated with a clock having a slight delay from the rising of the data.

In both techniques, the data discriminating circuit itself can be constituted of a logic circuit, for example, a gate array, thus ensuring the simplification of the circuit and reducing the cost.

According to the technique disclosed in Japanese Unexamined Patent Publication No. 233850/1989, even when data of "0" is erroneously discriminated as "1" with both types of clocks, either clock is considered as the proper one. Further, the discrimination result is influenced by the time difference between the two types of clocks and the time difference occurring at the time the input data is distributed to two discrimination sections (D-FF), very delicate timing design is required.

As the technique disclosed in Japanese Unexamined Patent Publication No. 188050/1989 deals with a double-frequency clock, a clock having a frequency twice the transmission rate of the transmission system should be prepared. Therefore, the general structure of the system lacks affinity, and this system should have a clock multiplication circuit, thus eventually resulting in the enlargement of the circuit scale.

According to the prior arts, therefore, it is not possible to achieve the system which reliably and surely performs data discrimination while properly keeping the phase relation between data and the clock. Such a system, if accomplished, should suffer the complicated circuit and the large circuit scale.

SUMMARY OF THE INVENTION

It is therefore an object of the present invention to provide a data discriminating circuit capable of performing data discrimination with the proper phase relation settled between data and a clock with a relatively simple circuit structure.

It is another object of this invention to provide an optical receiver which uses such a data discriminating circuit.

It is a further object of the present invention is to provide a data discriminating circuit comprising a clock distributor for generating first and second clock signals having different phases; first and second data discriminating/judging sections for respectively receiving the first and second clock signals from the clock distributor and commonly receiving data from a data input section; and a discriminated-data selecting section for receiving first discriminated data discriminated with the first clock signal by the first data discriminating/judging section, a first discrimination/judgment result produced based on a phase relation between the first discriminated data and the first clock signal, second discriminated data discriminated with the second clock signal by the second data discriminating/judging section, and a second discrimination/judgment result produced based on a phase relation between the second discriminated data and the second clock signal, and selectively outputting the first discriminated data or the second discriminated data based on the first and second discrimination/judgment results.

It is a still further object of this invention is to provide an optical receiver comprising an optical signal receiving section; an equalizer/amplifier for amplifying a photoelectrically converted electric signal from the optical signal receiving section to a predetermined level; a timing extractor; and the above-described data discriminating circuit, an output of the equalizer/amplifier being a data input of the data discriminating circuit, an output of the timing extractor being a clock input of the data discriminating circuit.

Other objects and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7(a) through 7(e) are block diagrams showing different examples of a data/CLK phase-relation detector;

DETAILED DESCRIPTION OF THE PREFERRED EMBODIMENTS

Figure 1:
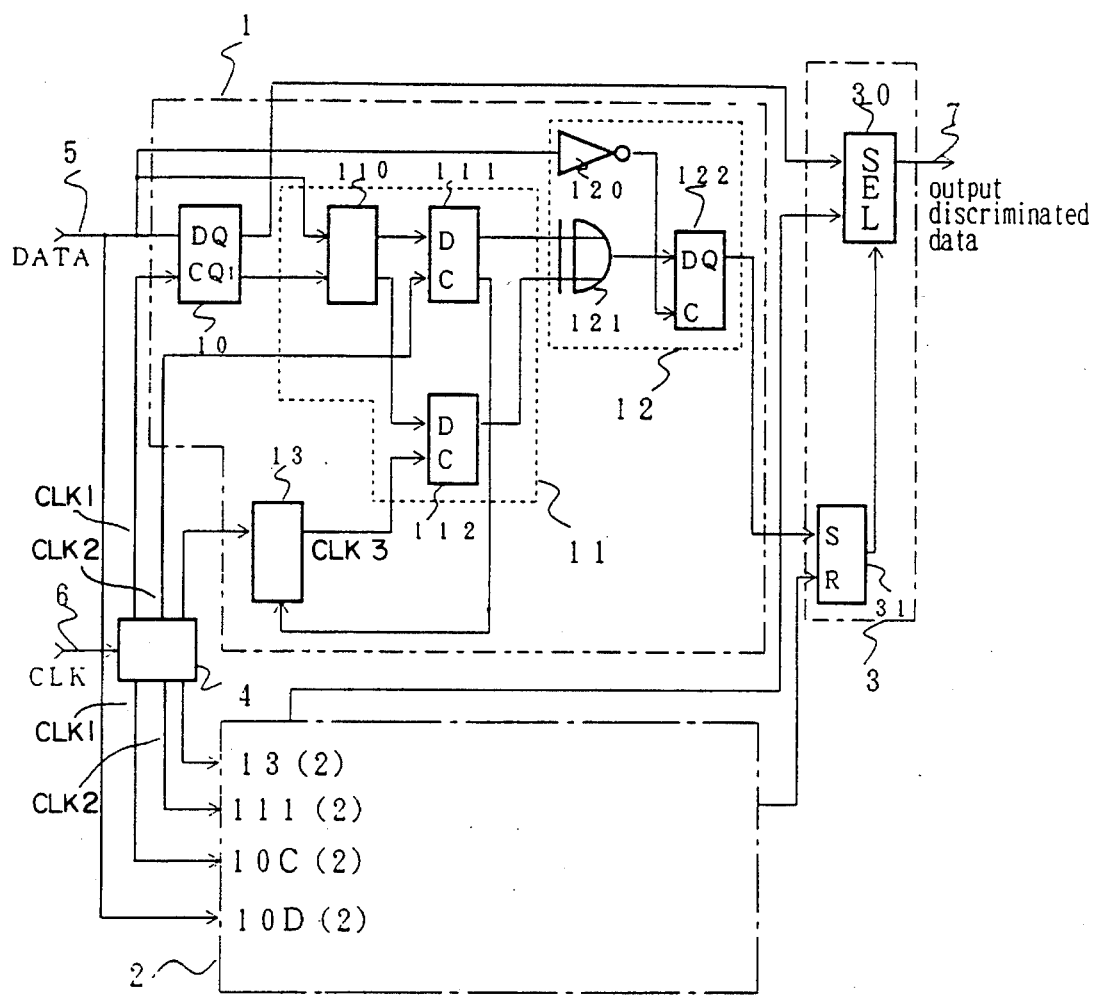
FIG. 1 is a block diagram of a first embodiment of the present invention.

FIG. 1 illustrates a data discriminating circuit according to a first embodiment of the present invention. Reference numerals "1" and "2" are data discriminating/judging sections which preferably have the same structure. Reference numeral "3" is a discriminated-data selecting section and "4" is a clock distributor. Reference numeral "5" denotes a data (DATA) input section, and "6" a clock signal (CLK) input section.

Data input from the data input section 5 is digital data which is acquired by amplifying an electric signal, converted from an optical signal received at, for example, the light-receiving section of an optical receiver (to be described later) to a discriminatable level.

This data is input to the data discriminating/judging sections 1 and 2. The data discriminating/judging sections 1 and 2 also receive a clock signal of a predetermined phase produced by the clock distributor 4 based on a clock signal input from the clock signal input section 6.

The data discriminating/judging sections 1 and 2 discriminate the input data with the clock signal supplied from the clock distributor 4, and outputs the discriminated data and a discrimination result produced based on the phase relation between the discriminated data and the clock signal.

The discriminated-data selecting section 3 receives the discriminated data and the discrimination results from the data discriminating/judging sections 1 and 2. Based on the discrimination results, the discriminated-data selecting section 3 selectively outputs the discriminated data from the data discriminating/judging section 1 or 2 as valid data to a discriminated-data outputting section 7.

A description will now be given on the detailed structures of the data discriminating/judging sections 1 and 2, taking the data discriminating/judging section 1 as an example. The data discriminating/judging section 1 has a data discriminating section 10, a data/clock phase-relation detecting and judging section 11, a phase-relation judging result processing section 12 and a clock phase controller 13. The data input from the data input section 5 is input to the data discriminating section 10. The data discriminating section 10 is constituted of a delay type flip-flop (D-FF) in the embodiment shown in FIG. 1, and the data is input to the D terminal of this D-FF. The D-FF 10 receives at its C terminal a clock signal of a first phase from the clock distributor 4. Accordingly, "1" and "0" levels of the input data are discriminated with the clock signal of the first phase in the D-FF 10.

The data discriminated by the D-FF 10 is input to the data/clock phase-relation detecting and judging section 11, which in turns detects the phase relation between the discriminated data from the data discriminating section 10 and the input data from the data input section 5. This section 11 further judges whether or not the phase relation between the input data and the clock signal of the first phase which is used to discriminate the input data is proper.

The output of the phase-relation detecting and judging section 11 is processed by the phase-relation judging result processing section 12. This processing section 12 produces a control signal which allows the discriminated-data selecting section 3 to output the discriminated data from the data discriminating/judging section 1 or 2 as valid data to the discriminated-data outputting section 7 based on the processing result from this processing section 12.

In FIG. 1, the data discriminating/judging section 2 has the same structure as the data discriminating/judging section 1. Thus, reference numerals "13(2)," "111(2)," "10C(2)" and "10D(2)" in the data discriminating/judging section 2 mean that the associated lines are connected to where the components corresponding to those denoted by "13", "111", "10C" and "10D" in the data discriminating/judging section 1 are located.

Figure 2:
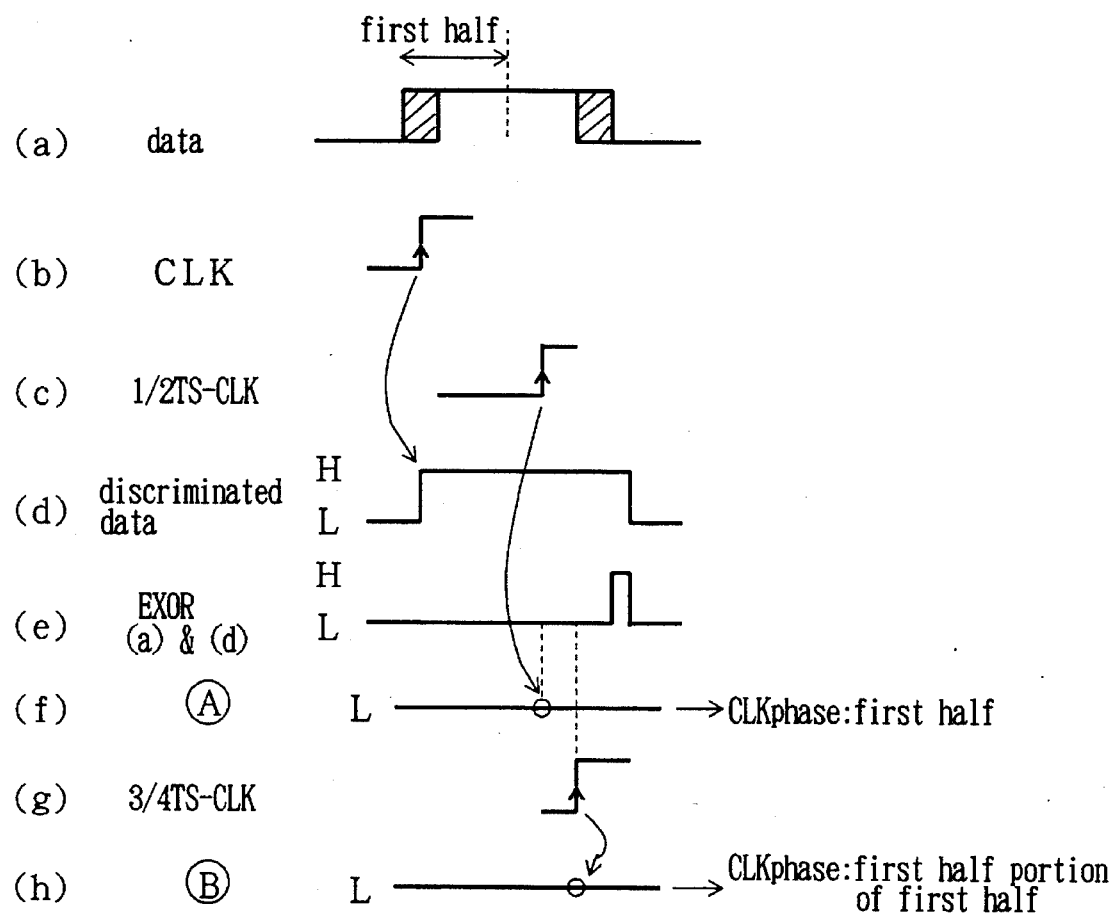
FIG. 2 is a diagram for explaining the functional principle of this invention (part 1)
Figure 3:
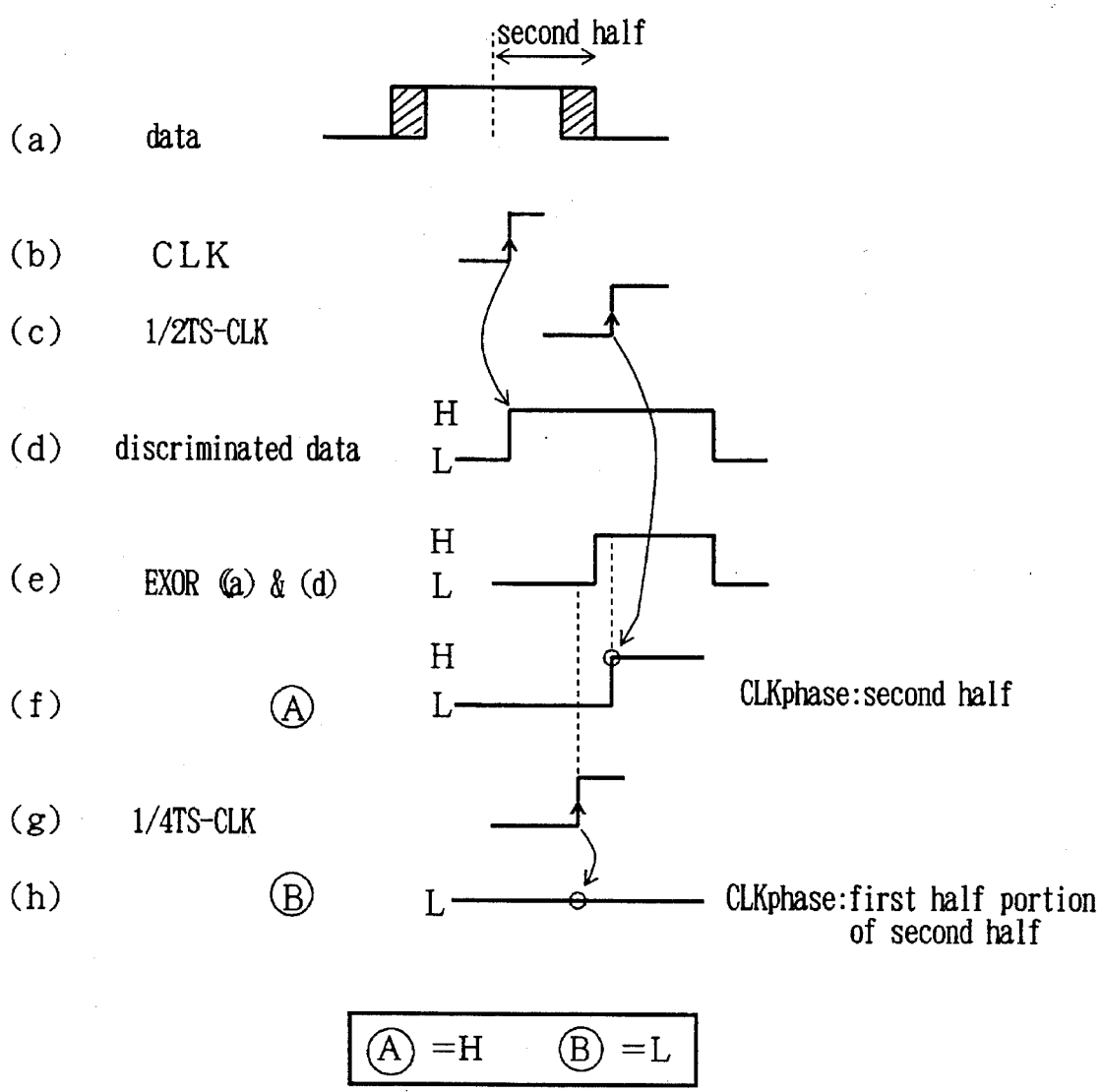
FIG. 3 is a diagram for explaining the functional principle of this invention (part 2)

FIGS. 2 and 3 are diagrams for explaining the functional principle of this invention for better understanding of the function of the embodiment shown in FIG. 1. First, the rising phase of a clock signal from the clock distributor 4 (data being discriminated at this phase) has four possible typical phase relations with respect to data: the first half of the period, the second half thereof, the first half portion of the first half or second half and the second half portion of the first half or second half.

Due to jittering or the like, data has undiscriminatable periods in the front and back portions of the data where the level is unsettled and cannot therefore be undiscriminatable. The shaded portions at the front and back portions of input data shown in FIGS. 2(a) and 3(a) are the undiscriminatable periods. When the rising timing (phase) of a clock signal lies in such an undiscriminatable period, data cannot be discriminated.

FIG. 2(a) illustrates the case where the rising phase of the clock signal lies in the unsettled period at the front portion of data, and FIG. 3(a) illustrates the case where the rising phase of the clock signal lies in the settled period at the back portion of the data.

In FIG. 2(b), CLK indicates the rising of a clock signal of the first phase which is to be input to the data discriminating/ judging section 1 from the clock distributor 4, and 1/2TS-CLK of FIG. 2(c) indicates the rising of a clock signal of the second phase which is to be input to the data discriminating/ judging sections 1 and 2 from the clock distributor 4.

The clock signal CLK of FIG. 2(b) and the clock signal 1/2TS-CLK of FIG. 2(c) have a predetermined phase difference, which is ½ of a time slot in the embodiment shown in FIG. 1. Data input to the data discriminating/judging section is discriminated at the rising phase of the clock signal CLK of FIG. 2(b). The discriminated data becomes as shown in FIG. 2(d).

Then, the EXOR operation of the discriminated data of FIG. 2(d) and the input data of FIG. 2(a) is performed. Based on the operation result, the phase relation between the input data of FIG. 2(a) and the clock signal CLK of FIG. 2(b) is detected and a pulse output having a pulse width as shown in FIG. 2(e) is obtained. The detection result this time is the phase relation expressed by the pulse width. This will be easily understood when the pulse output of FIG. 2(e) is compared with a pulse output shown in FIG. 3(e) which will be described later.

Then, the pulse in FIG. 2(e), the result of the detection of the phase relation, is discriminated at the rising of the clock signal 1/2TS-CLK of FIG. 2(c) of the second phase. The logic level of the discrimination result is "L" (see A in FIG. 2(f) which means that the rising phase of the clock signal CLK of FIG. 2(b) lies in the first half of the input data of FIG. 2(a).

In this case, the pulse in FIG. 2(e) or the result of the detection of the phase relation is discriminated again with a clock signal 3/4TS-CLK of FIG. 2(g) of a third phase, which lags by ¼ period from the clock signal 1/2TS-CLK of FIG. 2(c) of the second phase. The logic level of the discrimination result this time also becomes "L" (see B in FIG. 2(h)), which means that the rising phase of the clock signal CLK of FIG. 2(b) lies in the first half portion of the first half of the input data of FIG. 2(a) or in an undiscriminatable period.

Therefore, the logic levels of both discrimination results are "L," which means that the rising phase of the clock CLK of FIG. 2(b) lies in the front undiscriminatable period of the input data. Any data which is discriminated with a clock signal having this phase cannot be used.

Clock signals CLK of FIG. 3(b) and 1/2TS-CLK of FIG. 3(c) in FIG. 3 are the same as those in FIG. 2 which have already been discussed above.

Data input to the data discriminating/judging section is discriminated at the rising phase of the clock signal CLK of FIG. 3(b). The discriminated data becomes as shown in FIG. 3(d).

Then, the EXOR operation of the discriminated data of FIG. 3(d) and the input data of FIG. 3(a) is performed. As a result, a pulse output having a pulse width as shown in FIG. 3(e) is obtained.

Then, the pulse in FIG. 3(e), the result of the detection of the phase relation, is discriminated at the rising of the clock signal 1/2TS-CLK of FIG. 3(c) of the second phase. Unlike in the case of FIG. 2, the logic level of the discrimination result becomes "H" (see A in FIG. 3(f)). This means that the rising phase of the clock signal CLK of FIG. 3(b) lies in the second half of the input data of FIG. 3(a).

In this case, the pulse in FIG. 3(e) or the result of the detection of the phase relation is discriminated again with a clock signal 1/4TS-CLK of FIG. 3(g) of a third phase, which leads by ¼ period from the clock signal 1/2TS-CLK of FIG. 3(c) of the second phase. The logic level of the discrimination result this time also becomes "L" (see B in FIG. 3(h)), which means that the rising phase of the clock signal CLK of FIG. 3(b) lies in the first half portion of the second half of the input data of FIG. 3(a).

Unlike in the case of FIG. 2, the logic level of the discrimination result A is "H" while the logic level of the discrimination result B is "L," which means that the rising phase of the clock CLK of FIG. 3(b) lies in the back discriminatable period of the input data. Any data which is discriminated with a clock signal having this phase can be used as correctly-discriminated data.

This embodiment of the present invention which functions based on the above-described functional principle will now be explained referring again to FIG. 1 and time charts given in FIGS. 4 and 5.

Figure 4:
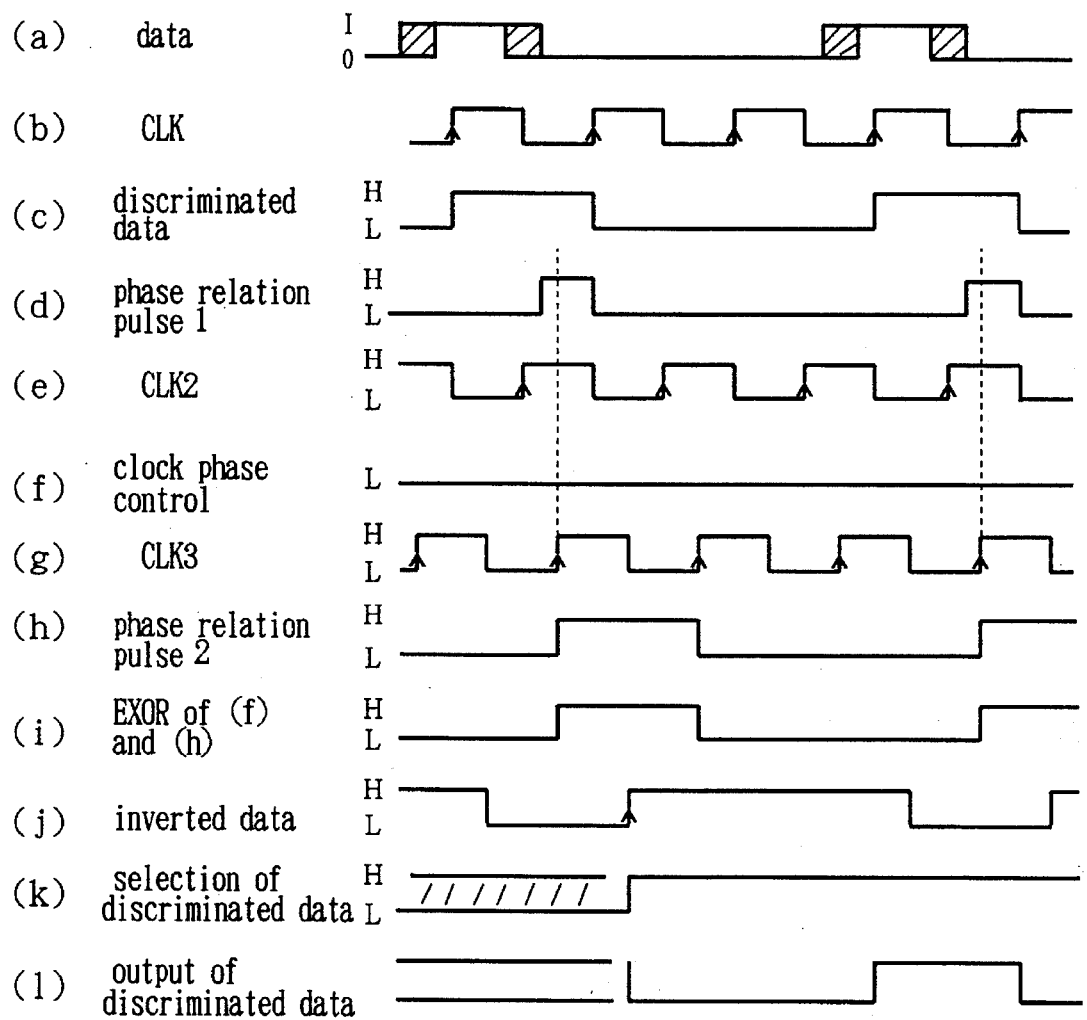
FIG. 4 is a time chart for the operation of this embodiment (part 1)
Figure 5:
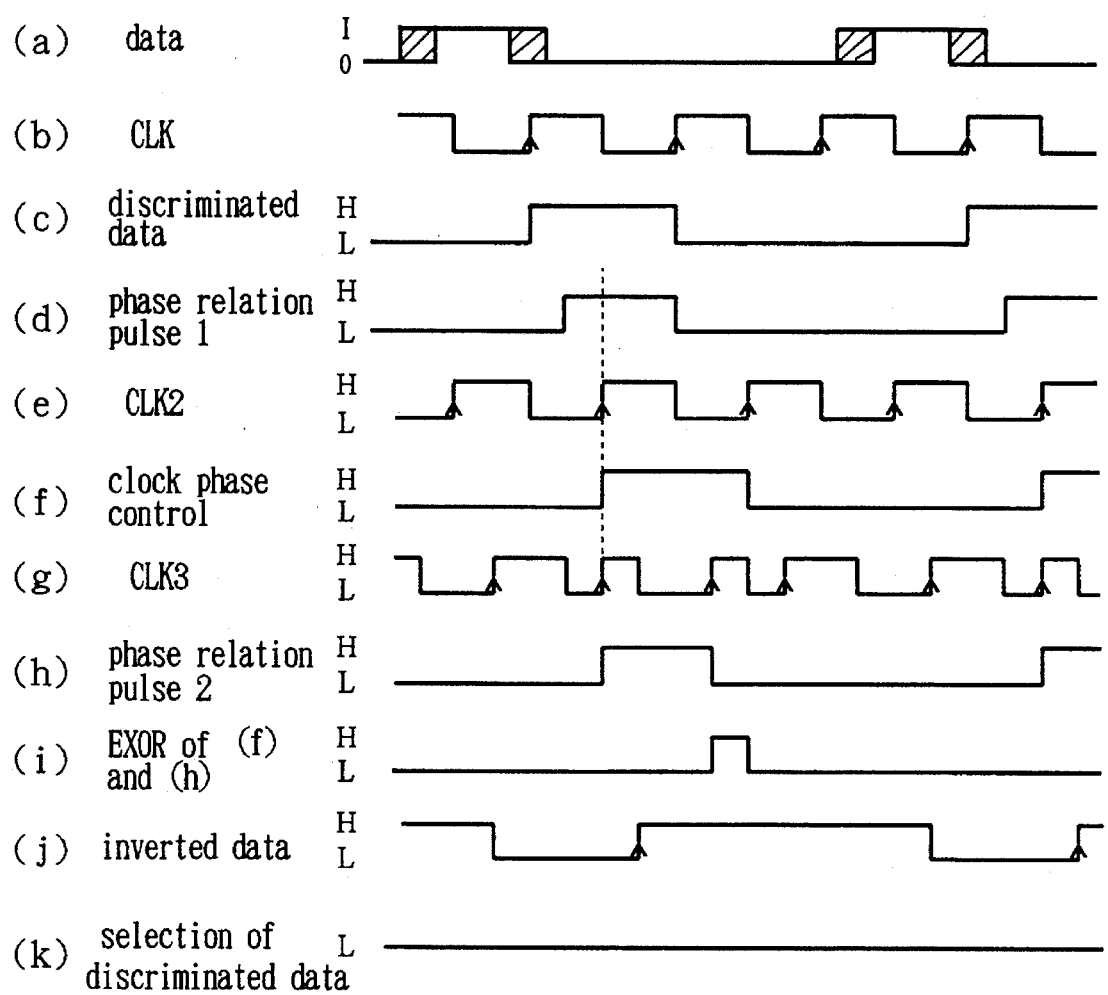
FIG. 5 is a time chart for the operation of this embodiment (part 2)

FIG. 4 illustrates the case where the rising phase of the clock signal of FIG. 4(b) of the first phase lies in the first half of the discriminatable regions input data of FIG. 4(a), and FIG. 5 illustrates the case where the rising phase of that clock signal of FIG. 5(b) lies in the back undiscriminatable region of the input data of FIG. 5(a). Therefore, there are four typical rising phase relations between the input data and the clock signal of the first phase as in the above-described case which has been described with reference to the functional principle diagrams of FIGS. 2 and 3.

Returning to FIG. 4, the input data of FIG. 4(a) is input from the data input section 5 to the data discriminating section 10 of the data discriminating/judging section 1 and the data discriminating section 10(2) of the data discriminating/judging section 2.

The phase of the clock signal CLK to be input to the clock distributor 4 from the clock input section 6 is adjusted to be a predetermined phase before this clock signal CLK is supplied to the individual sections. The clock signal of the first phase shown in FIG. 4(b) is supplied to the C terminal of the data discriminating section 10 from the clock distributor 4. A clock signal having a predetermined phase difference from the first phase of the clock signal shown in FIG. 4(b) is supplied to the C terminal of the data discriminating section 10(2) of the data discriminating/judging section 2. In a typical case, the predetermined phase difference is ½ of the time slot TS as will be understood from a later description given with reference to FIG. 6.

Therefore, a clock signal shown in FIG. 5(b) has a phase lagging by a ½ time slot from the first phase of the clock signal shown in FIG. 4(b). In the following description, it is this clock signal in FIG. 5(b) which is input to the data discriminating section 10(2).

The data discriminating section 10 discriminates the input data of FIG. 4(a) at the timing of the rising of the clock signal CLK of FIG. 4(b), providing discriminated data shown in FIG. 4(c). This discriminated data is supplied to a selector 30 in the discriminated-data selecting section 3 in the embodiment shown in FIG. 1. At the same time, the input data of FIG. 4(a) is input to a data/clock phase-relation detecting section (hereinafter simply called "phase-relation detector") 110 in the phase-relation detecting and judging section 11.

There are various possible structures for the phase-relation detector 110. To output the phase relation as a pulse width, the phase-relation detector 110 can take any of the following specific structures: an inverter 71 and an EXOR gate 72 (FIG. 7(a)), a NOR gate 73 (FIG. 7(b)), an inverter 74 and an AND gate 75 (FIG. 7(c)), an AND gate 76 (FIG. 7(d)), or an EXOR gate 77 and an inverter 78 which inverts a clock signal for a D-FF 111 (FIG. 7(e)). Further, the phase-relation detector 110 may be constituted of an RS-FF (reset and set flip-flop) though not shown.

In the following detailed description of the function of the embodiment shown in FIG. 1, the phase-relation detector 110 will be explained as having the structure of FIG. 7(c). In FIG. 7(c), input data (DATA) is input via the inverter 71 to one input of the AND gate 74, and the Q output of the data discriminating section 10 is input to the other input of the AND gate 74. In FIGS. 4 and 5, the logic level of uninverted input data (a) is shown. Thus, the discriminated data (c) indicates the Q1 output of the data discriminating section 10 whose logic has been inverted.

Under the above circumstances, the phase-relation detector 110 detects the phase relation between the input data of FIG. 4(a) and the discriminated data of FIG. 4(c) and thus the phase relation the input data of FIG. 4(a) and the clock signal of FIG. 4(b). The detected phase relation is indicated by a pulse width. In other words, a phase relation pulse is output as the detection result from the phase-relation detector 110 in FIG. 4.

As will be understood from the foregoing description given with reference to FIGS. 2 and 3, the pulse width of the phase relation pulse of FIG. 4(d) varies in accordance with the rising phase of the clock signal of FIG. 4(b) with respect to the input data of FIG. 4(a).

The phase relation pulse of FIG. 4(d) is input to a D-FF (delay type flip-flop) 111. A clock signal of the second phase of FIG. 4(e) is input to the D-FF 111. This clock signal of the second phase of FIG. 4(e) has a phase difference of a ½ time slot with respect to the clock signal of the first phase (b) in FIGS. 4 and 5.

The phase relation pulse of FIG. 4(d) is discriminated at the rising phase of the clock signal of the second phase of FIG. 4(e) in the D-FF 111. The discrimination result is a low-level logic "L" as shown in FIG. 4(f). The output of the phase-relation detector 110 is input to the D input terminal of another D-FF 112. The D-FF 112 receives at the C input terminal a clock signal of the third phase of FIG. 4(g) which has undergone phase control in the clock phase controller 13.

The clock signal of the third phase of FIG. 4(g) is the clock signal of the second phase of FIG. 4(e) which has been further delayed by a ¼ time slot by the discrimination result from the D-FF 111 or the phase control signal shown in FIG. 4(f). More specifically, based on the result of the detection such that the rising phase of the clock signal of FIG. 4(b) lies in the first half of the input data of FIG. 4(a) when the logic level of the phase control signal of FIG. 4(f) is "L," the clock signal of the second phase of FIG. 4(e) is delayed by a ¼ time slot by the clock phase controller 13.

Therefore, the D-FF 112 discriminates the phase relation pulse of FIG. 4(d) at the rising phase of the clock signal of the third phase of FIG. 4(g). The discrimination result is output as a second phase relation pulse of FIG. 4(h). The second phase relation pulse of FIG. 4(h) is input together with the clock phase control signal of FIG. 4(f) from the D-FF 111 to an EXOR gate 121 of the phase-relation judging result processing section 12.

The EXOR gate 121 performs an EXOR operation on the clock phase control signal of FIG. 4(f) and the second phase relation pulse of FIG. 4(h), yielding a logic output as shown in FIG. 4 of FIG. 4(i). This logic output (i) is input to the D input terminal of a D-FF 122.

Inverted data of FIG. 4(j) which is the input data of FIG. 4(a) inverted by an inverter 120 is input to the C input terminal of the D-FF 122. Accordingly, the EXOR logic output of the EXOR gate 121 is discriminated at the rising phase of the inverted data of FIG. 4(j) or the falling phase of the input data of FIG. 4(a)).

The discrimination result from the D-FF 122 becomes a discriminated-data select signal of FIG. 4(k). This signal of FIG. 4(k) is input to the S input terminal of an RS-FF 31, which is the switching control section of the discriminated-data selecting section 3. The discriminated-data selecting section 3 further has the selector 30, constituted of a multiplexer or the like, which receives the discriminated data of FIG. 4(c) from the first and second data discriminating/judging sections 1 and 2.

One of the discriminated data of FIG. 4(c) input to the selector 30 is selectively output under the control of the switching controller 31. In the example shown in FIG. 4, as the phase of the clock signal of FIG. 4(b) lies in a region where the input data of FIG. 4(a) can properly be discriminated, the discriminated data of FIG. 4(c) from the first data discriminating/judging section 1 is output from the selector 30 (see FIG. 4(1)).

FIG. 5 shows an operational time chart for the case where the rising phase of the clock signal of FIG. 5(b) lies in the back portion of the input data of FIG. 5(a). In this case, the proper discrimination of the input data of FIG. 5(a) is not possible as has already been discussed with reference to FIG. 2.

As described with reference to FIG. 4, the phase relation between the discriminated data of FIG. 5(c) and the input data of FIG. 5(a) is detected at the rising phase of the clock signal of FIG. 5(b). This phase relation is shown by the phase relation pulse of FIG. 5(d). This phase relation pulse of FIG. 5(d) is further discriminated with the clock signal of the second phase of FIG. 5(e).

As the rising phase of the clock signal (b) in FIG. 5 differs that in FIG. 4, the clock phase control signal (f) output as a result of the pulse discrimination with the clock signal of the second phase (e) will have a positive logic level of "H" unlike in the case of FIG. 4. In this case, the clock phase controller 13 advances the clock phase by a ¼ time slot in response to the clock phase control signal of FIG. 5(f) from the D-FF 111.

The phase relation pulse of FIG. 5(d) is discriminated again with a clock signal of the third phase of FIG. 5(g) leading by a ¼ time slot in the D-FF 112. The discrimination result is the output of FIG. 5(h) of the D-FF 112 which also has a positive logic level of "H." Then, an EXOR output of FIG. 5(i) resulting from the EXOR operation on the clock phase control signal of FIG. 5(f) output from the D-FF 111 and the output of FIG. 5(h) of the D-FF 112, is output from the EXOR gate 121.

The D-FF 122 discriminates this EXOR output of FIG. 5(i) with the data of FIG. 5(j) which is the input data of FIG. 5(a) inverted. The discrimination result is discriminated data of FIG. 5(k) which has a logic level of "L" unlike in the case of FIG. 4.

When the logic level of the discriminated data of FIG. 5(k) is "L," the discriminated data of FIG. 5(c) is not used and the discriminated-data selecting section is controlled so as to output the discriminated data of FIG. 5(b) from the other data discriminating/judging section.

Let us compare the logic levels of the results of the discrimination with the clock signal of the second phase of FIG. 5(e) and the clock signal with the third phase of FIG. 5(g) as discussed with reference to FIGS. 2 and 3. A="L" and B="H" in the case of FIG. 4, whereas A="H" and B="H" in the case of FIG. 5.

When the logic levels of A and B differ from each other, therefore, the rising phase of the clock signal of FIG. 5(b) has such a phase relation with respect to the input data of FIG. 5(a) as to allow for correct discrimination of the input data of FIG. 5(a). When the logic levels of A and B are both "L" or "H," the rising phase of the clock signal of FIG. 5(b) lies in the front or back undiscriminatable region of the input data of FIG. 5(a) due to jittering or a setup hold time, thus disabling correct discrimination of the input data of FIG. 5(a).

In the embodiment of this invention, the phase relation is judged by the phase-relation judging result processing section 12 having the structure as shown in FIG. 1, and the discriminated data of FIG. 5(a) from either the data discriminating/judging section 1 or 2 is output based on the judgment. By using the aforementioned relation of the logic levels, therefore, the processing section 12 may take other structures than the one shown in FIG. 1.

In the foregoing description, no specific description of the phase relation between the clock signals of the first phase of FIG. 5(b) in the first and second data discriminating/judging sections 1 and 2 has not been given except that those clock signals have a phase difference of a ½ time slot in a typical case. This phase relation will therefore be considered referring to FIG. 6.

With the data discriminating circuit using two data discriminating/judging sections having the same structure as shown in FIG. 1, the bit rate of the input data of FIG. 5(a) input to the data discriminating section 10 is determined by the phase difference between the discrimination clock of FIG. 5(b) and the input data of FIG. 5(a).

Figure 6:
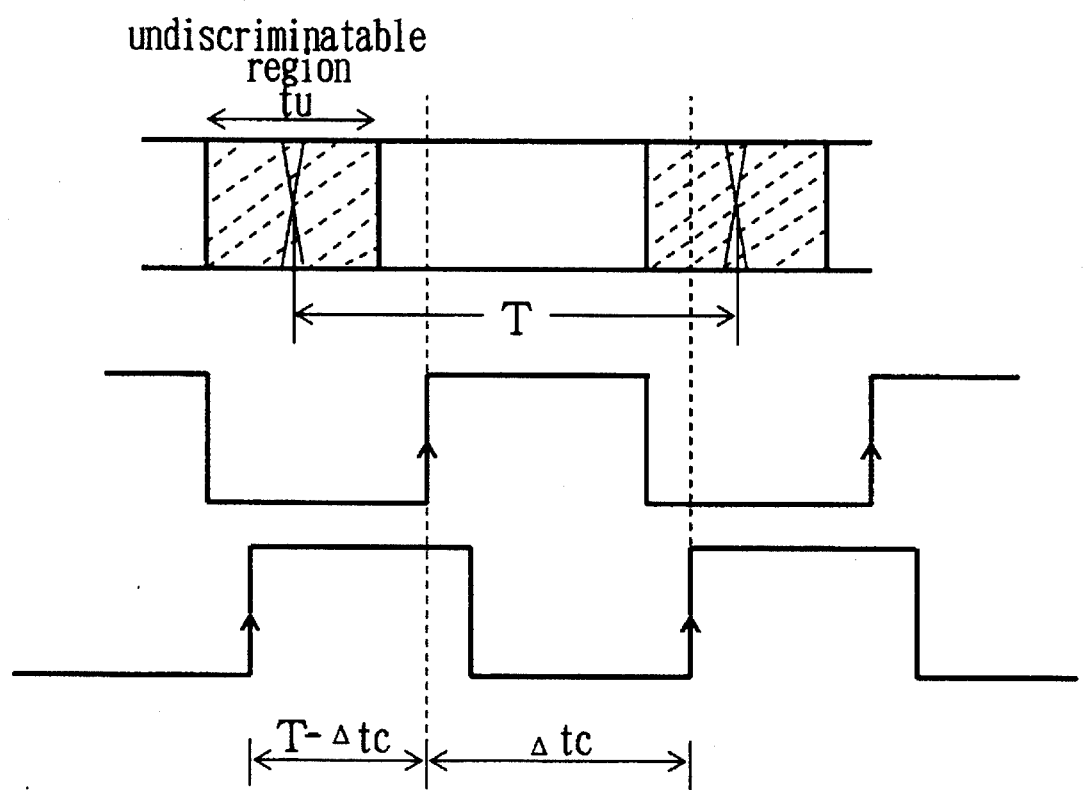
FIG. 6 shows the phase relation between a discrimination clock (CLK) and input data.

Given that one time slot (clock period) is T, the phase difference of two clock signals with respect to the input data is $\Delta tc$ and the time length of each undiscriminatable region due to the aforementioned jittering or setup hold time is tu as shown in FIG. 6, since at least one of the two clock signals should lie outside the undiscriminatable region, the following condition should be met.

$$tu \leq \Delta tc \text{ and } tu \leq T - \Delta tc$$

From those two equations, the following condition is derived for $\Delta tc$.

$$tu \leq \Delta tc \leq T - \Delta tu$$

The highest bit rate of the data is determined by the condition that gives the smallest T. From the following equation, therefore, $$2tu \leq \Delta tc + tu \leq T$$

T becomes the smallest when $tu = \Delta tc$, and is given by two times the time length of the undiscriminatable region.

If this invention is applied to discrimination of as fast a signal as possible, on the premise that the length of the undiscriminatable region is equal to or less than ½ of one time slot, the relative phase difference of the clock signals (b) input to the D-FFs 10 and 10(2), the data discriminating sections in the first and second data discriminating/judging sections 1 and 2, with respect to the highest bit rate of the input data (a) to be discriminated should at least be equal to or larger than a ½ time slot. For instance, to use this invention to discriminate a 622-Mb/s signal, there should be a phase difference of 1/622 (Mb/s)×½=804 ps.

In FIG. 4, the phase relation between the clock signal of the second phase of FIG. 4(e), used to discriminate the phase relation pulse of FIG. 4(d) in the D-FF 111, and the discrimination clock of FIG. 4(b), when viewed as the relative phase relation with respect to the input data of FIG. 4(a), becomes a reference for judging if the phase difference (time difference) between the rising of the discrimination clock of FIG. 4(b) and the transitional point of the input data of FIG.

4(a) is greater than the phase relation between the clock signal of FIG. 4(b) and the clock signal of FIG. 4(e).

Since two data discriminating/judging sections with the same structure as shown in FIG. 1 function symmetrically, it is proper to set the phase relation between the clock signal (b) and the clock signal (e), when viewed as the relative phase relation with respect to the transitional point of the input data (a), in such a way that there is a phase difference of a ½ time slot with respect to at least the highest bit rate of the data to be discriminated.

In this case, it is judged from the discrimination with the clock signal (e) is made first to see if the discrimination clock (b) lies in the first half or second half of one time slot of the input data (a).

To judge more finely the phase relation in the first half or second half of the time slot, the phase is altered by the clock phase controller 13 in accordance with the result of discrimination with the clock signal (e) or the discrimination result from the D-FF 111 and the phase relation pulse (d) is discriminated with the clock signal of the third phase (g) in the D-FF 112.

In this case, if the phase of the clock signal that changes in accordance with the discrimination result of the D-FF 111, when viewed as the relative phase relation with respect to the transitional point of the input data (a), is set in such a way that it has a phase difference of a ½ time slot with respect to at least the highest bit rate of the data to be discriminated, two clock signals with different phases can work symmetrically, because of the above-described reason.

In the discrimination in the D-FF 111, it is judged if the discrimination clock of the first phase (b) lies in the first half or second half of one time slot of the input data (a). Likewise, in the discrimination in the D-FF 112, the phase relation between the discrimination clock and the input data in the first half or second half of one time slot of the input data based on the phase difference, as a reference, between the clock signal input to the D-FF 111 and the clock signal input to the D-FF 112 with respect to the transitional point of the data.

Thus, if the phase difference between the clock signal (e) input to the D-FF 111 and the clock signal (g) input to the D-FF 112 with respect to the transitional point of the data is set to differ by ½ of the ½ time slot or a ¼ time slot with respect to at least the highest bit rate of the data to be discriminated, two clock signals of different phases can work symmetrically in the discrimination in the D-FF 112. The designed bit rate can thus be made highest.

Figure 8:
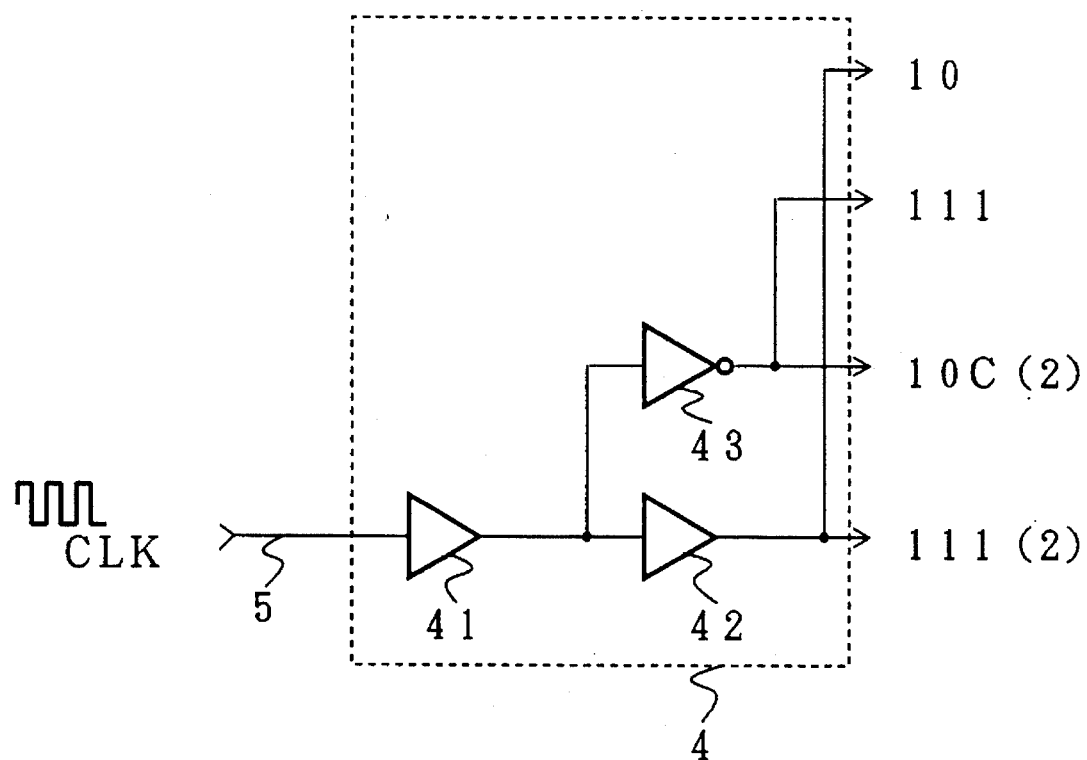
FIG. 8 is a block diagram showing a clock distributor (part 1)

There are various structures for the clock distributor 4 which produces a plurality of clock signals having a mutually predetermined phase difference as described above. In FIG. 8, for example, the clock distributor 4 comprises an input buffer 41 for clock signals, a clock buffer 42 and an inverter 43.

As signals output from the clock buffer 42 and the inverter 43 have a mutually inverted phase relation, the two signals are input to the data discriminating section 10 and the D-FF 111 or the first data/clock phase-relation judging section in each of the first and second data discriminating/judging sections 1 and 2, as clock signals (b) mutually having a phase difference of a ½ time slot.

Figure 9A:
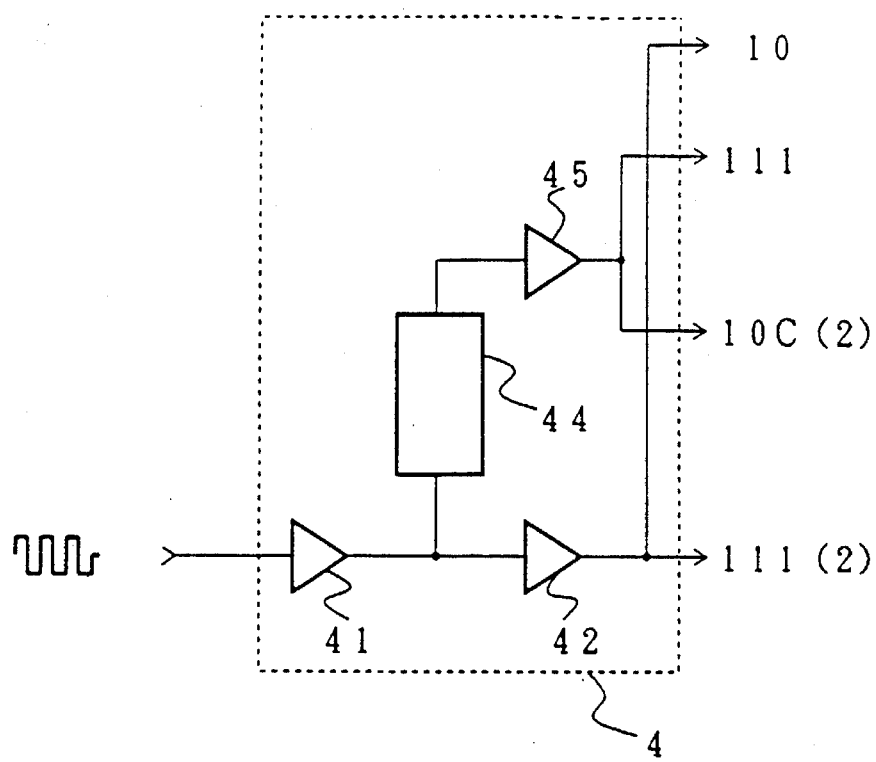
FIGS. 9(a) and 9(b) are block diagrams modifications of the clock distributor (part 2)

In the structure shown in FIG. 9(a), the inverter 43 is replaced by delay means 44 whose delay time provides the phase difference between the clock signals to be input to the data discriminating section 10 or 10(2) and the D-FF 111 (the first data/clock phase-relation judging section) in each of the first and second data discriminating/judging sections 1 and 2.

Figure 9B:
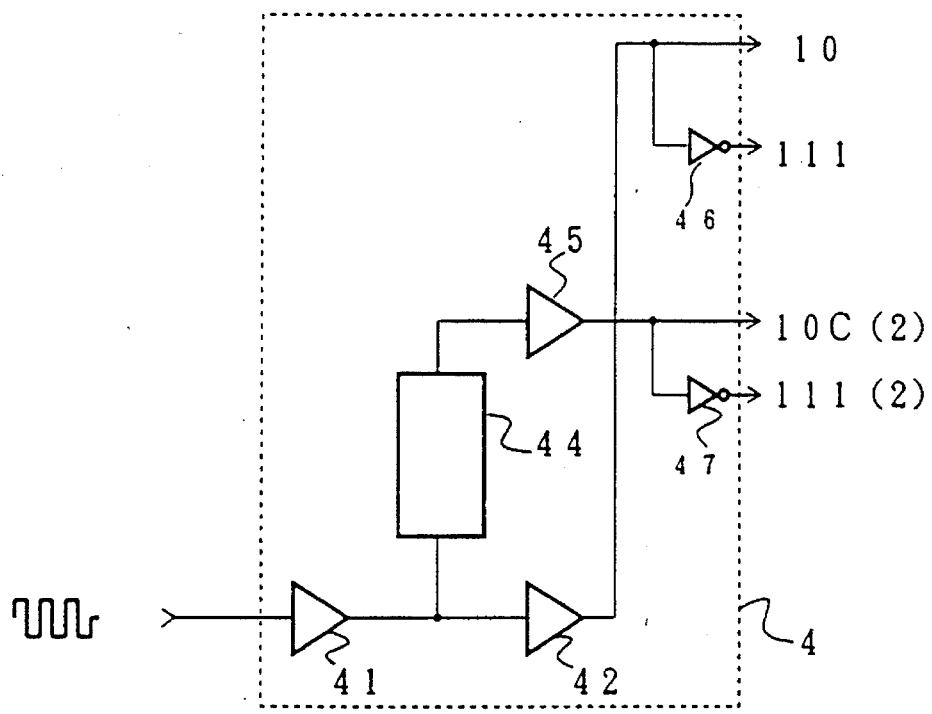

The structure shown in FIG. 9(b) has delay means 44 and inverters 46 and 47 to provided symmetrical drivers for the clock signals to be input to the data discriminating sections 10 and 10(2) and the D-FFs 111 in the first and second data discriminating/judging sections 1 and 2. The phase relation between the clock signals input to the data discriminating sections 10 and 10(2) is given by the delay means 44, while the phase relation between the clock signals input to the data discriminating section 10 and the D-FF 111 as the first data/clock phase-relation judging section is given by the inverters 46 and 47.

As the delay means 44 shown in FIGS. 9(a) and 9(b), either a logical gate element, or a fixed or variable delay element (passive element) is to be used. To accomplish the delay means with a logical gate element, for example, an OR-NOR gate element in the FUJITSU MB810 series can be used. The use of this element provided a delay of about 400 ps and is most suitable for the aforementioned signal bit rate of 622 Mb/s.

Figure 10A:
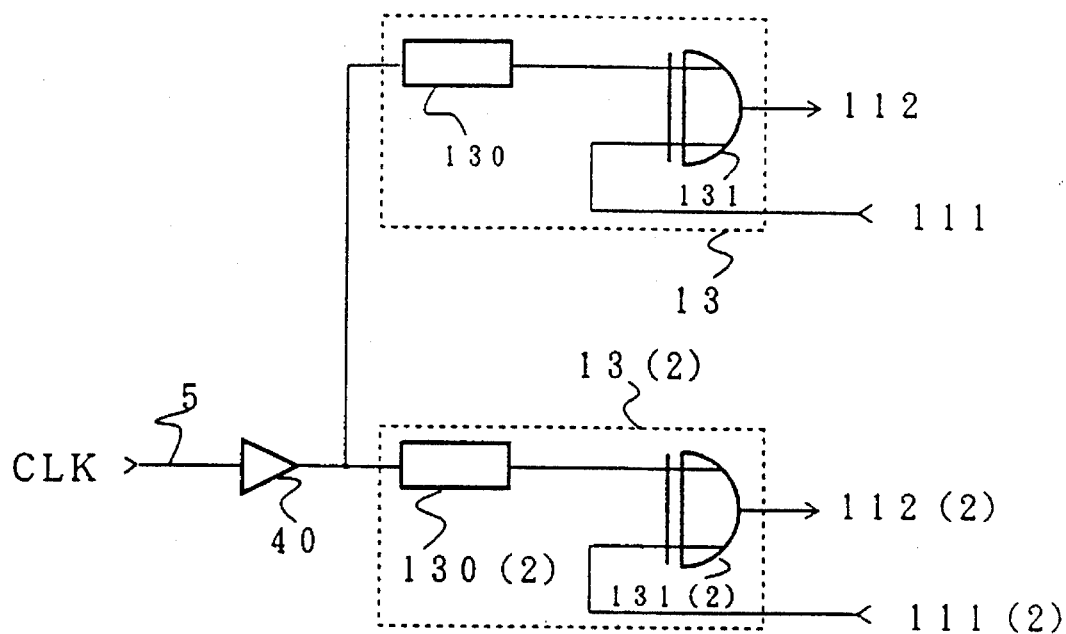
FIGS. 10(a) and 10(b) are block diagrams showing examples of a clock phase controller (part 1)
Figure 10B:
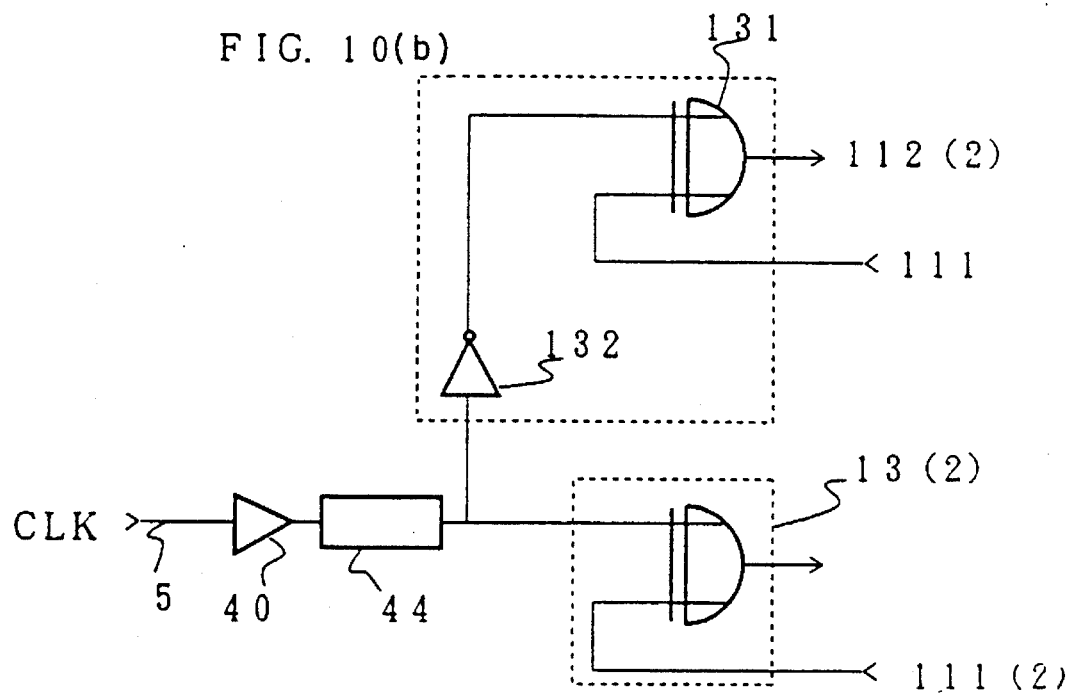
Figure 11:
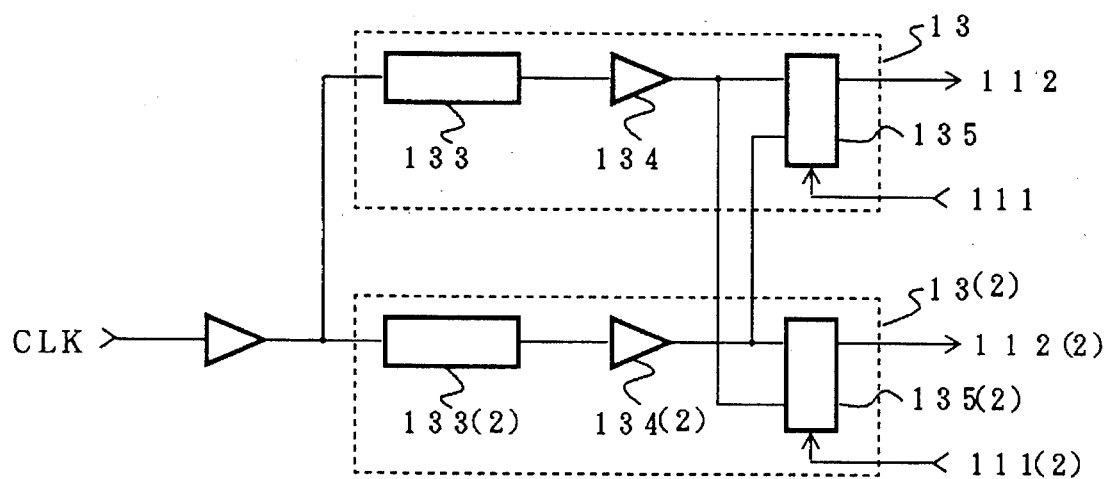
FIG. 11 is a block diagram showing a further modification of the clock phase controller (part 2)

The clock phase controller 13 in the first and second data discriminating/judging sections 1 and 2, which performs phase control on the clock signal (g) input to the second data/clock phase-relation judging section 112 based on the result of the judgment in the first phase-relation judging section 111, may takes the structures shown in FIGS. 10(a), 10(b) and 11.

In the structure shown in FIG. 10(a), delay means 130 and 130(2) are used to permit the clock signal to be input to the second phase-relation judging section 112 to have a predetermined phase difference with respect to the clock signal to be input to the first phase-relation judging section 111. In the structure shown in FIG. 10(b), the phase of the former clock signal is inverted by an inverter 132 so that the phase differs from the phase of the latter clock signal by a ½ time slot.

Then, inversion control is performed to determined if the polarities of the clock signal to be input to EXOR gates 131 and 131(2) should be inverted in accordance with the judgment result ("L" or "H") in the first phase-relation judging section 111.

In the structure shown in FIG. 11, multiplexers or selectors 135 and 135(2) are used in place of the EXOR gates, one of two types of clock signals whose phases are respectively set by delay means 133 and 133(2) is selectively output in accordance with the judgment result ("L" or "H" ) in the first phase-relation judging section 111.

The delay means 130 and 130(2) shown in FIG. 10(a) and the delay means 133 and 133(2) shown in FIG. 11 can each be accomplished by either a logical gate element, or a fixed or variable delay element (passive element) as mentioned earlier with reference to FIG. 9.

In the foregoing description, the processing is all done by logic processing. As judgment is done only when data "1" exists, no consideration need to be given to any measure for the case where data "0" is mistaken for data "1."

In the above-described embodiment of this invention, a data discriminating circuit, which selectively outputs data discriminated with a clock signal with the proper phase, can be accomplished according to the principle of this invention. In a logic circuit used in an actual receiver or the like, for example, in a frame synchronization circuit, a sync protection circuit for detecting a frame is provided.

Figure 12:
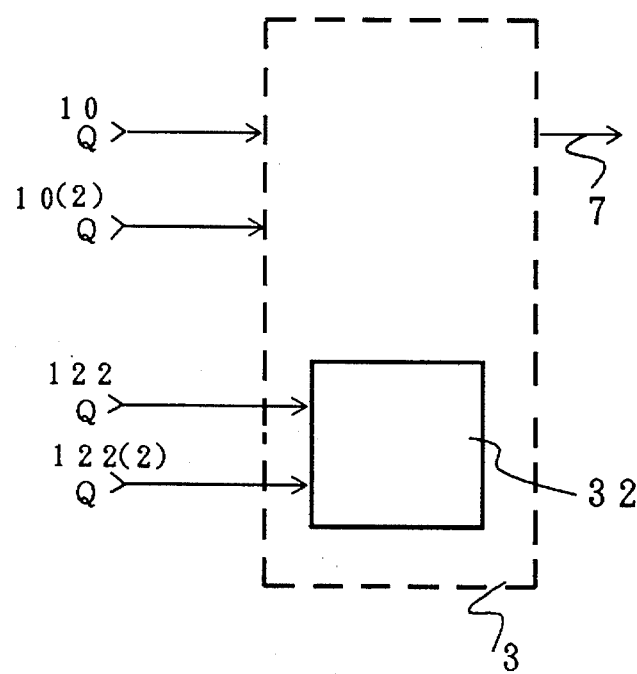
FIG. 12 is a block diagram showing another embodiment using a sync protection circuit.

In the data discriminating circuit of this invention, therefore, as in the above case, a sync protection circuit may be provided. FIG. 12 presents a conceptual diagram showing a sync protection circuit 32 provided in the discriminated-data selecting section 3. As the sync protection circuit, an ordinary type constituted of a shift register is used so that discriminated data, which has been discriminated with the clock with the phase that has been used to properly discriminate data a predetermined number of times consecutively, is selectively output.

Figure 13:
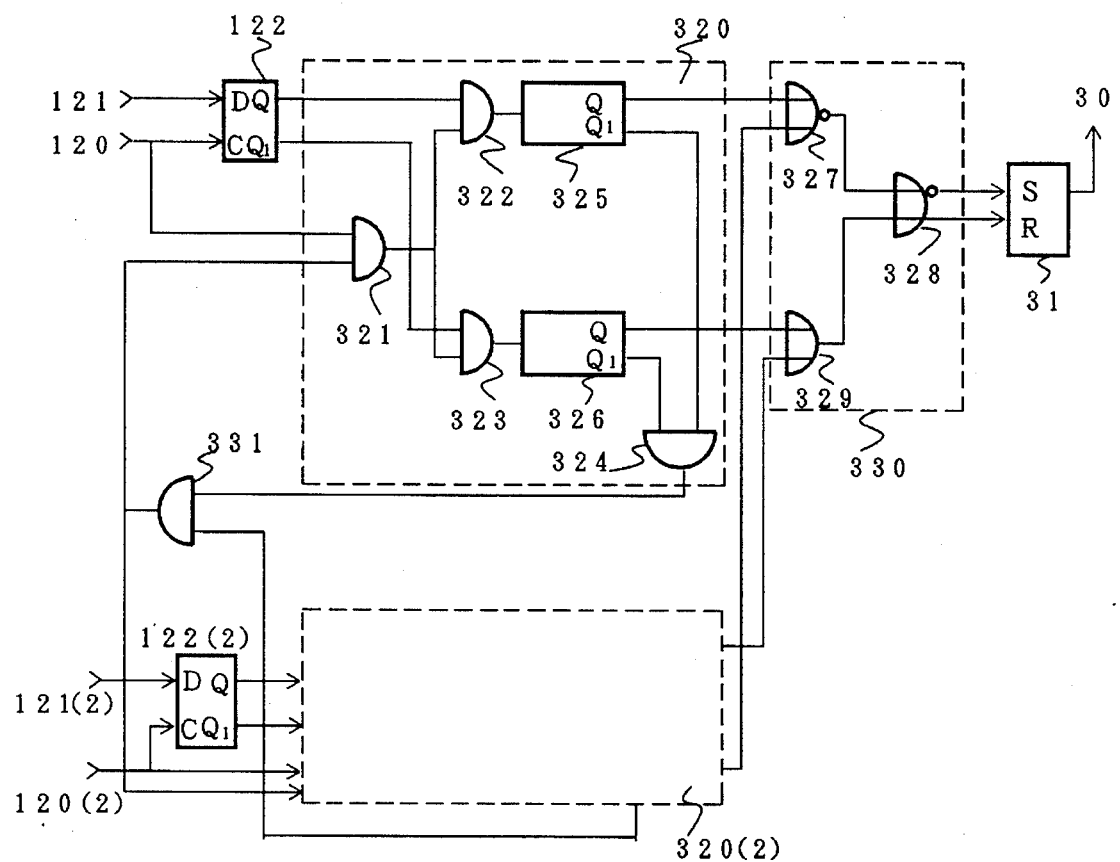
FIG. 13 is a block diagram showing a modification of the sync protection circuit.

But, the structure shown in FIG. 13 is preferable in view of the high-speed signal discrimination process, a variation or instability of the internal circuits, or the need for the consideration of the case where judgment may not be settled consecutively in a predetermined number of times. In other words, a counter has only to be used in the sync protection circuit so that the discriminated data may be selected from that system which provides the proper result of judgment a predetermined number of times if not consecutively.

The structure shown in FIG. 13 has two sync protection circuits 320 and 320(2) in association with the structure shown in FIG. 1. In this example, the sync protection circuits 320 and 320(2) are respectively provided in association with the D-FFs 122 and 122(2), and the circuits 320 and 320(2) respectively have counters 325 and 326.

The two counters 325 and 326 respectively count mutually inverted data from the D-FFs 122 and 122(2). Accordingly, the improper judgment results as well as the proper judgment results are counted. A discriminated-data select signal processing section 330 comprising a NOR gate 327, an OR gate 329 and OR/NOR gate 328 performs such control that if the improper judgment result occurs a predetermined number of times, data that has been discriminated with the clock signal having the inverted phase is output. This design permits the discrimination phase to be always settled with respect to the data length equal to or less than a given value.

Each of the sync protection circuits 320 and 320(2) further includes AND gates 321,322 and 323 arranged in such a way that when any one of the Q outputs of the four counters 325, 326, 325(2) and 326(2), two each in the two sync protection circuits, becomes "H," the output of the AND gate 331 becomes "L," thus preventing a pulse from being input to the associated counters. Accordingly, the phase once stabilized is kept as it is.

As described above, this invention can accomplish a data discriminating circuit in a receiver, which is constituted only of a logic circuit, discriminates data with two types of clock signals of mutually inverted phases, and outputs the data discriminated with the proper one of the clock signals.

Figure 14:
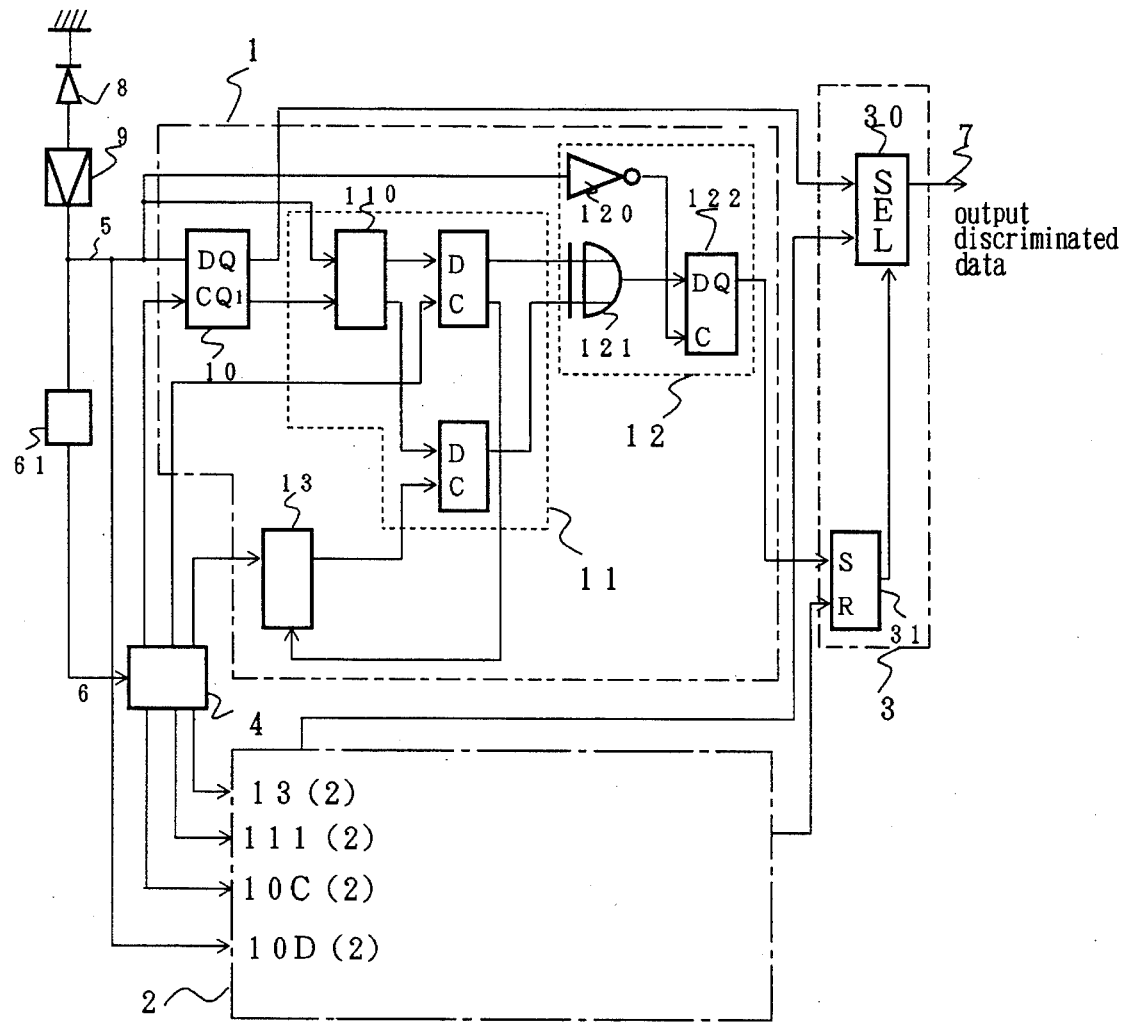
FIG. 14 is a block diagram showing a further embodiment of this invention as applied to an optical receiver.

FIG. 14 is a block diagram showing a further embodiment of this invention as applied to an optical receiver, illustrating the block structure of the optical receiver.

FIG. 14 uses like or same reference numerals as used in FIG. 1 to specify corresponding or identical components. Thus, the first and second data discriminating/judging sections 1 and 2, the discriminated-data selecting section 3 and the clock distributor 4 function in the same manner as have been described earlier referring to FIG. 1.

What differs from the structure of FIG. 1 is the provision of a photodiode (PD) 8, an equalizer/amplifier 9 and a clock extractor 61. The optical signal input to the PD 8 is photoelectrically converted, and the resultant signal is amplified to a discriminatable level by the equalizer/amplifier 9. The output of the equalizer/amplifier 9 is input to the data discriminating sections 10 and 10(2) from the data input section 5, and at the same time is input to the clock extractor 61, which is a timing circuit, to extract a clock signal. The extracted clock signal is input to the data discriminating section from the clock input section 6.

The data input from the data input section 5 is discriminated with the clock signal input from the clock input section 6, and discriminated data that has been discriminated with the clock signal of the proper phase is output from the discriminated-data selecting section 3.

The sync protection circuit as described above with reference to FIGS. 12 and 13 may of course be added to the embodiment shown in FIG. 14.

A plurality of optical receivers as shown in FIG. 14 may be arranged in parallel to constitute a parallel optical receiver which receives optical signals input in parallel from a plurality of transmission paths.

In this case, the timing circuit has only to be equipped in at least one receiving circuit. If needed, separate clock transmission may be provided which transmits a clock signal in a separate optical transmission path in parallel to data.

Figure 15:
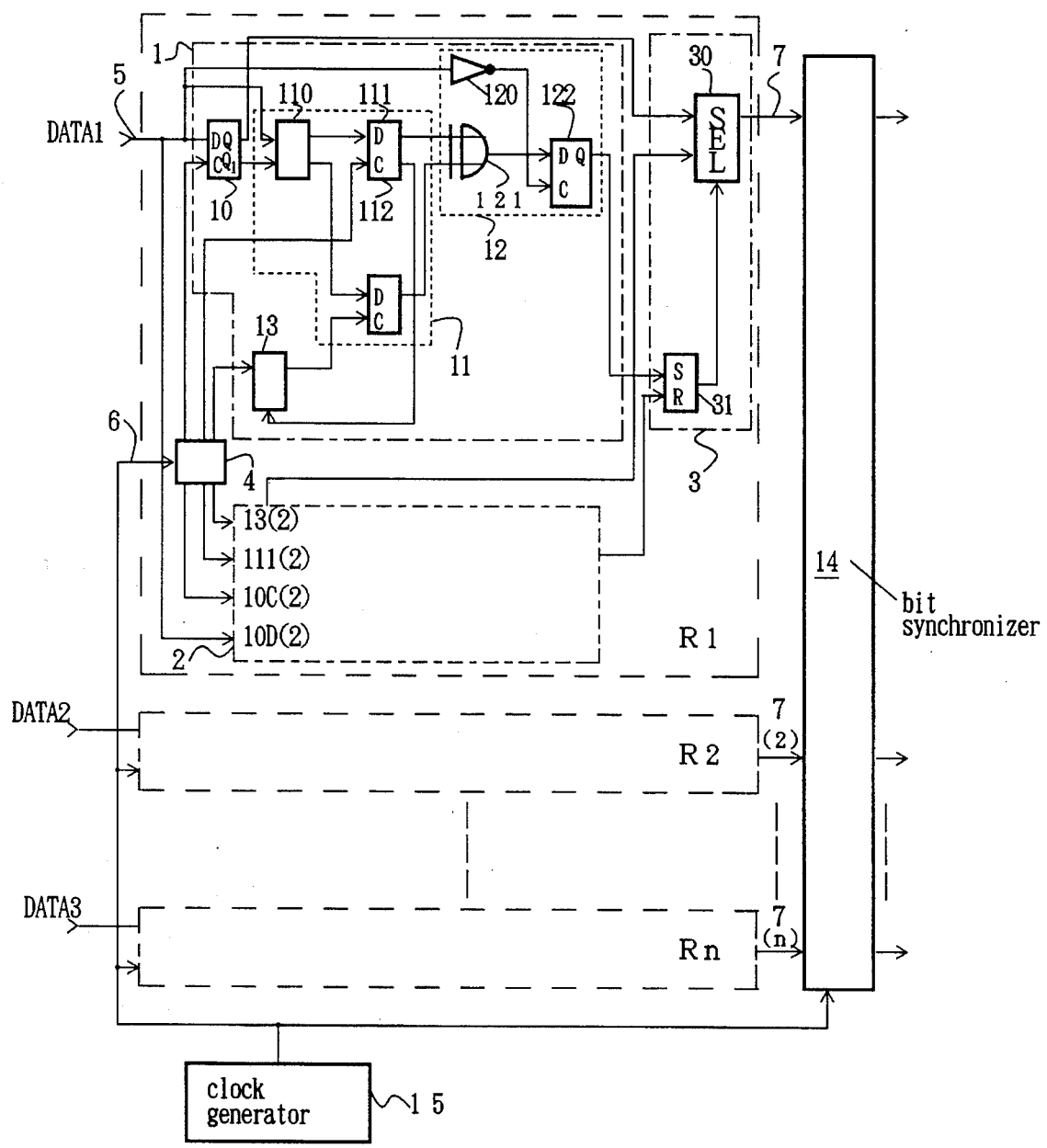
FIG. 15 is a block diagram exemplifying the structure of a parallel receiver of this invention.
Figure 16A:
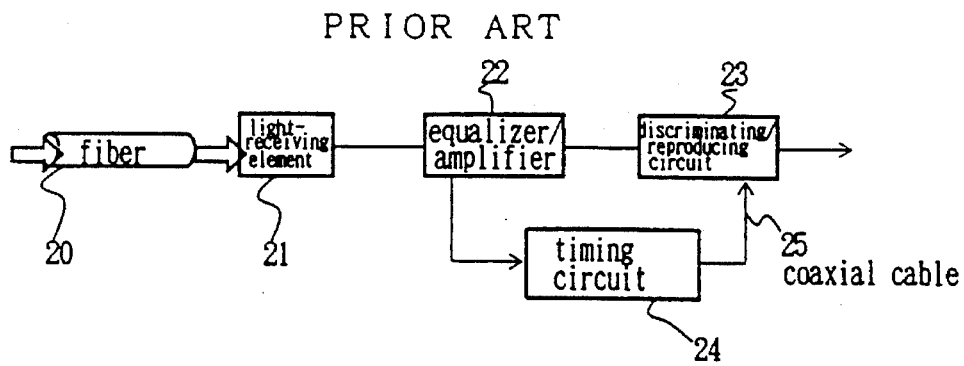
FIGS. 16(a) and 16(b) are block diagrams exemplifying the prior art.
Figure 16B:
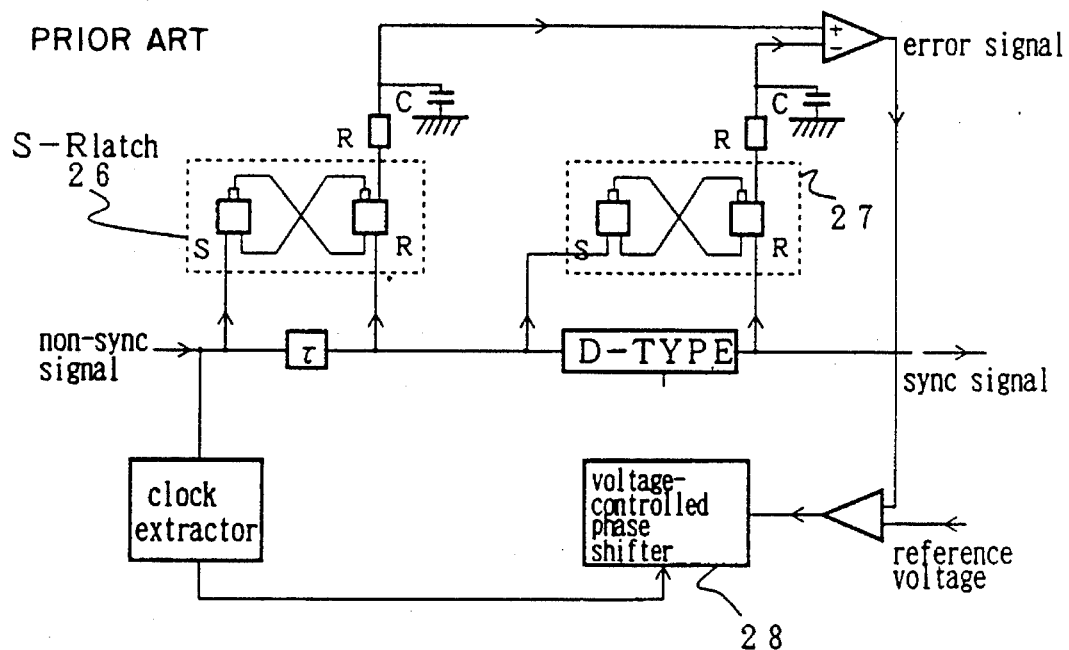

If the bit phases of parallel data need to be matched, bit synchronization should be performed with the clock signal from a common clock generator 15 using D-FFs provided in a bit synchronizer 14 in association with the channel outputs as shown in FIG. 15. In FIG. 15, "R1," "R2," . . . , "Rn" denote n parallel receiver sections arranged in parallel.

Alternatively, only the data that has been discriminated with one of two clock signals is discriminated again with the inverted clock signal, thereby ensuring phase matching of the bits. In some system structure which involves a quite different system clock signal, this clock signal may be input from the clock input section 6.

As described above, according to this invention, in a receiver that constitutes a digital signal transmission system, a data discriminating circuit for discriminating signals can be constituted only of a logic circuit. It is therefore possible to provide a low-cost data discriminating circuit constituted of a gate array or the like, and an optical receiver with a simple structure using this data discriminating circuit, thus greatly contributing to accomplishing an optical receiver with a simple circuit structure in a close range optical transmission system such as an optical subscriber system.

The present invention may be embodied in other specific forms without departing from the spirit or essential characteristics thereof.

The present embodiments are therefore to be considered in all respect as illustrative and not restrictive, the scope of the invention being indicated by the appended claims rather than by the foregoing description, and all changes, which come within the meaning and range of equivalency of the claims, are therefore intended to be embraced therein.

What is claimed is:

1. A data discriminating circuit for discriminating digital data signals comprising:

a data input section for inputting a digital data signal;

a clock distributor section for outputting first and second clock signals having different phases from each other;

a first data discriminating/judging section for receiving the first clock signal from the clock distributor section and the input digital data signal from the data input section and providing a first discriminated digital data signal and a first result of discriminating the input digital data signal with the first clock signal;

a second data discriminating/judging section for receiving the second clock signal from the clock distributor section and the input digital data signal from the data input section and providing a second discriminated digital data signal and a second result of discriminating the input digital data signal with the first clock signal; and a discriminated-data selecting section for receiving the first and second results of discriminating the input digital data signal respectively from the first and second data discriminating/judging sections and selectively outputting the first discriminated digital data signal or the second discriminated digital data signal based on the first and second results of discriminating the input digital data signal.

2. The data discriminating circuit according to claim 1, wherein each of the first and second data discriminating/judging sections includes:

a data discriminating section for discriminating an input digital data signal from the data input section with a clock signal supplied from the clock distributor section;

a data/clock phase-relation detecting and judging section for detecting and judging a phase relation between the input digital data signal and the clock signal, based on the data signal discriminated by the data discriminating section and the input digital data signal supplied from the data input section and for providing a detected and judged phase relation; and a phase-relation result processing section for producing a select control signal to control a selection of the first and second discriminated digital data signals in the discriminated-data selecting section from the detected and judged phase relation output from the data/clock phase-relation detecting and judging section and the input digital data signal.

3. The data discriminating circuit according to claim 2, wherein the data/clock phase-relation detecting and judging section has a data/clock phase-relation detecting section and first and second data/clock phase-relation judging sections, and the data/clock phase-relation detecting section produces a pulse having a pulse width corresponding to a phase difference between the digital data signal discriminated by the data discriminating section and the input gigital data signal, whereby based on a result of judgment of the phase relation between the input digital data signal and the clock signal from the pulse width in the first data/clock phase-relation judging section, a clock signal to be input to the second data/clock phase-relation judging section is controlled.

4. The data discriminating circuit according to claim 3, wherein the data discriminating section and the first and second data/clock phase-relation judging sections are each comprised a D-FF (flip-flop);

the phase-relation result processing section includes an inverter for inverting input digital data signal, an EXOR gate to which outputs of the first and second data/clock phase-relation judging sections are input, and a D-FF having a D input terminal supplied with an output of the EXOR gate and a C input terminal supplied with an output of the inverter; and the discriminated-data selecting section has a multiplexer or a selector to which outputs of the first and second data discriminating/judging sections are input, and an RS-FF having an S input terminal supplied with the output of the first data discriminating/judging section, an R input terminal supplied with the output of the second data discriminating/judging section, whereby the multiplexer or selector is controlled by an output of the RS-FF to selectively output the output of the first data discriminating/judging section or the output of the second data discriminating/judging section.

5. The data discriminating circuit according to claim 3, wherein the clock distributor section at least has one input buffer supplied with a clock signal from a clock input section, and an inverter; and clock signals in mutually inverted states are respectively input to the data discriminating section and the first data/clock phase-relation judging section of each of the first and second data discriminating/judging sections.

6. The data discriminating circuit according to claim 3, wherein the clock distributor section at least has one input buffer supplied with a clock signal from a clock input section, a first clock buffer, delay means and a second clock buffer associated with a delayed clock signal output from the delay means; and clock signals respectively input to the data discriminating section and the first data/clock phase-relation judging section of each of the first and second data discriminating/judging sections have a phase difference corresponding to a delay time in the delay mans.

7. The data discriminating circuit according to claim 6, wherein the delay means comprises a semiconductor gate element, or a delay element having a fixed or variable delay amount.

8. The data discriminating circuit according to claim 3, wherein the clock distributor at least has one input buffer supplied with a clock signal from a clock input section, a first clock buffer, delay means, a second clock buffer associated with a delayed clock signal output from the delay means and an inverter;

clock signals respectively input to the data discriminating section and the first data/clock phase-relation judging section of each of the first and second data discriminating/judging sections have a phase difference corresponding to a delay time in the delay means; and clock signals in mutually inverted states are respectively input to the data discriminating section and the first data/clock phase-relation judging section of each of the first and second data discriminating/judging sections.

9. The data discriminating circuit according to claim 3, wherein the data/clock phase-relation detecting section comprises an inverter and an EXOR gate having one input terminal supplied with input data from the data input section via the inverter and an other input terminal supplied with an inverted output of the discriminated data from the data discriminating section.

10. The data discriminating circuit according to claim 3, wherein the data/clock phase-relation detecting section comprises a NOR gate having one input terminal supplied with input data directly from the data input section and an other input terminal supplied with an inverted output of the discriminated data from the data discriminating section.

11. The data discriminating circuit according to claim 3, wherein the data/clock phase-relation detecting section comprises an inverter and an AND gate having one input terminal supplied with input data from the data input section via the inverter and an other input terminal supplied with a non-inverted output of the discriminated data from the data discriminating section.

12. The data discriminating circuit according to claim 3, wherein the data/clock phase-relation detecting section comprises an AND gate having one input terminal supplied with input data directly from the data input section and an other input terminal supplied with a non-inverted output of the discriminated data from the data discriminating section.

13. The data discriminating circuit according to claim 2, wherein the first and second clock signals have a phase difference of a half of a time slot with respect to at least a highest bit rate of the digital data signals to be discriminated.

14. The data discriminating circuit according to claim 13, wherein a clock signal of a first phase to be input to the data discriminating section in each of the first and second data discriminating/judging sections and a clock signal of a second phase to be input to a first D-FF in the data/clock phase-relation detecting and judging section each have a phase difference of a half a time slot with respect to at least a highest bit rate of the digital data signals to be discriminated, and two types of clock signals of a third phase to be input to a second D-FF in the data/clock phase-relation detecting and judging section each have a phase difference of a half a time slot with respect to at least the highest bit rate of the digital data signals to be discriminated; and each of the first and second data discriminating/judging sections has a clock phase controller for selectively outputting one of the two types of clock signals of the third phase in accordance with a discrimination result from the first D-FF.

15. The data discriminating circuit according to claim 14, wherein in each of the first and second data discriminating/judging sections, the clock signals to be respectively input to the first D-FF and the second D-FF are set to each have a phase difference of ¼ of a time slot with respect to the highest bit rate of the digital data signals to be discriminated, and the clock phase controller performs control in such a way that the phase of the clock signal to be input to the second D-FF leads or lags by ¼ of the time slot in accordance with the discrimination result from the first D-FF.

16. The data discriminating circuit according to claim 14, wherein the clock phase controllers of the first and second data discriminating/judging sections respectively include a common buffer supplied with a clock signal from a clock input section, first and second delay means supplied with an output of the buffer, and first and second EXOR gates having first input terminals respectively supplied with outputs of the first and second delay means and other input terminals respectively supplied with judgment results from the first data/clock phase-relation judging sections.

17. The data discriminating circuit according to claim 16, wherein the delay means comprises a semiconductor gate element, or a delay element having a fixed or variable delay amount.

18. The data discriminating circuit according to claim 14, wherein the clock phase controllers of the first and second data discriminating/judging sections respectively include a common buffer supplied with a clock signal from a clock input section, common delay means supplied with an output of the buffer, an inverter supplied with an output of the delay means, and first and second EXOR gates having first input terminals respectively supplied with an output of the inverter and the output of the delay means and other input terminals respectively supplied with judgment results from the first data/clock phase-relation judging sections.

19. The data discriminating circuit according to claim 14, wherein the clock phase controllers of the first and second data discriminating/judging sections respectively include a common buffer supplied with a clock signal from a clock input section, first and second delay means supplied with an output of the buffer, first and second clock buffers respectively supplied with outputs of the first and second delay means, and first and second multiplexers or selectors each supplied with outputs of the first and second clock buffers and respectively supplied with judgment results from the first data/clock phase-relation judging sections, whereby each of the first and second multiplexers or selectors selectively outputs one of the outputs of the first and second clock buffers in accordance with the associated judgment result.

20. The data discriminating circuit according to claim 14, wherein the data/clock phase-relation detecting section comprises an EXOR gate having one input terminal supplied with input data from the data input section and an other input terminal supplied with an inverted output of the discriminated data from the data discriminating section, and an inverted output of the clock phase controller is input to the first data/clock phase-relation judging section.

21. The data discriminating circuit according to claim 2, wherein the discriminated data selecting section has a synchronization protection circuit for receiving an output from the phase-relation result processing section.

22. The data discriminating circuit according to claim 21, wherein the synchronization protection circuit has a counter, and the discriminated-data selecting section selectively outputs the discriminated data from the first or second data discriminating/judging section when the counter counts the output of the phase-relation result processing section at least a predetermined number of times.

23. The data discriminating circuit according to claim 1, wherein the first and second clock signals have a phase difference of a half of a time slot with respect to at least a highest bit rate of the digital data signals to be discriminated.

24. An optical receiver comprising:

an optical signal receiving section;

an equalizer/amplifier for amplifying a photoelectrically converted electric signal from the optical signal receiving section to a predetermined level;

a timing extractor for providing a timing clock signal; and a data discriminating circuit having a data input section for receiving an output of the equalizer/amplifier as an input digital data signal; a clock distributor section for receiving the timing clock signal output of the timing extractor and outputting first and second clock signals having different phases from each other; a first data discriminating/judging section for receiving the first clock signal from the clock distributor section and the input digital data signal from the data input section and providing a first discriminated digital data signal and a first result of discriminating the input digital data signal with the first clock signal; a second data discriminating/judging section for receiving the second clock signal from the clock distributor section and the input digital data signal from the data input section and providing a second discriminated digital data signal and a second result of discriminating the input digital data signal with the first clock signal; and a discriminated data selecting signal for receiving the first and second results of discriminating the input digital data signal respectively from the first and second data discriminating/judging sections and selectively outputting the first discriminated digital data signal or the second discriminated digital data signal based on the first and second results of discriminating the input digital data signal.

\* \* \* \* \*

UNITED STATES PATENT AND TRADEMARK OFFICE
CERTIFICATE OF CORRECTION

PATENT NO. : 5,473,636
DATED : December 5, 1995
INVENTOR(S) : Hiroyuki ROKUGAWA

It is certified that error appears in the above-indentified patent and that said Letters Patent is hereby corrected as shown below:

Column 6, line 22, change "2(f)" to –2(f)),–/

Column 8, line 58, delete "FIG. 4 of".

Signed and Sealed this

Fifth Day of March, 1996

Attest:

BRUCE LEHMAN

Attesting Officer     Commissioner of Patents and Trademarks